UNITED STATES PATENT OFFICE.

GEORGE WRAY COOPER, OF NEW ORLEANS, LOUISIANA.

COMPOUND OIL-DRESSING FOR RUBBER BELTS.

SPECIFICATION forming part of Letters Patent No. 380,993, dated April 10, 1888.

Application filed September 26, 1887. Serial No. 250,749. (No specimens.)

*To all whom it may concern:*

Be it known that I, GEORGE WRAY COOPER, a citizen of the United States, residing at New Orleans, in the parish of Orleans and State of Louisiana, have invented a new and useful composition of matter to be used on rubber belts to render them soft, pliant, and elastic, and to prevent them from slipping, of which the following is a specification.

My composition consists of the following ingredients, combined in the proportions stated, viz: crude rubber, (caoutchouc,) eight pounds; oil of turpentine, one-half gallon; oil of lemongrass, one pound; citronelle, one pound; gum arabic, six ounces. These ingredients are thoroughly mixed and allowed to soak thirty-six hours. After soaking, add eight (8) gallons light-pressed fish-oil, the whole to be placed in an iron kettle and slowly cooked by steam for eight hours. After steaming, the kettle is taken off and the composition is allowed to cool. Four (4) gallons of linseed-oil is then placed in another kettle and made to boil down to two and a half (2½) gallons. This is then mixed with the composition in the other kettle and cooked by steam for six more hours.

I claim—

A composition of matter to be used on rubber belts in order to render them elastic, pliant, and soft, and to prevent them from slipping, consisting of crude rubber, (caoutchouc,) oil of turpentine, oil of lemon-grass, citronelle, gum arabic, and fish-oil, in the proportions specified, mixed with condensed linseed-oil, and cooked for the time above set forth.

GEORGE WRAY COOPER.

Witnesses:
ADAM SCHMITT,
A. DREYFOUS.